(12) United States Patent
Dörfler et al.

(10) Patent No.: US 11,628,115 B2
(45) Date of Patent: Apr. 18, 2023

(54) MASSAGE DEVICE AND SEAT WITH SUCH A MASSAGE DEVICE

(71) Applicant: ALFMEIER PRÄZISION SE, Treuchtlingen (DE)

(72) Inventors: Erich Dörfler, Landsberg (DE); Helmut Auernhammer, Höttingen (DE); Ronny Gehlmann, Allersberg (DE); Jürgen Baumgartl, Treuchtlingen (DE)

(73) Assignee: ALFMEIER PRÄZISION SE, Treuchtlingen (DE)

( * ) Notice: Subject to any disclaimer, the term of this patent is extended or adjusted under 35 U.S.C. 154(b) by 314 days.

(21) Appl. No.: 16/880,695

(22) Filed: May 21, 2020

(65) Prior Publication Data

US 2020/0368092 A1 Nov. 26, 2020

(30) Foreign Application Priority Data

May 22, 2019 (DE) .......................... 102019113629.6

(51) Int. Cl.
*A61H 1/00* (2006.01)
*A61H 9/00* (2006.01)
(Continued)

(52) U.S. Cl.
CPC ........... *A61H 1/005* (2013.01); *A61H 9/0078* (2013.01); *A61H 23/004* (2013.01);
(Continued)

(58) Field of Classification Search
CPC .............. A61H 7/00–002; A61H 7/004; A61H 7/007–008; A61H 2007/009;
(Continued)

(56) References Cited

U.S. PATENT DOCUMENTS 4,635,620 A * 1/1987 Ricchio .................. A61H 23/04
5/672
5,155,685 A 10/1992 Kishi et al.
(Continued)

FOREIGN PATENT DOCUMENTS

DE 10063478 A1 7/2002
DE 102011079712 A1 1/2013
(Continued)

OTHER PUBLICATIONS

Machine assisted English translation of JP2005168953A obtained from https://patents.google.com/patent on Oct. 27, 2020, 6 pages.
(Continued)

*Primary Examiner* — Timothy A Stanis
*Assistant Examiner* — Kelsey E Baller
(74) *Attorney, Agent, or Firm* — Warner Norcross + Judd LLP

(57) ABSTRACT

A massage device for a seat, in particular for a vehicle seat, is provided. The massage device includes at least one air cushion. The at least one air cushion has an air inlet so as to allow individual filling thereof with air via an air supply system. A vibration generating device is arranged between the air supply system and the air cushion and is in fluid communication with the air cushion so as to apply pressure vibrations to the air cushion. In addition, a seat including the massage device is also provided.

11 Claims, 2 Drawing Sheets

(51) Int. Cl.
*A61H 23/00* (2006.01)
*A61H 23/02* (2006.01)
*B60N 2/90* (2018.01)

(52) U.S. Cl.
CPC ......... *A61H 23/0218* (2013.01); *B60N 2/914* (2018.02); *B60N 2/976* (2018.02); *A61H 2201/0149* (2013.01); *A61H 2201/1207* (2013.01); *A61H 2201/1409* (2013.01); *A61H 2201/1654* (2013.01)

(58) Field of Classification Search
CPC ............ A61H 9/00–0007; A61H 9/005; A61H 9/0092; A61H 15/00; A61H 2201/02–0285; A61H 2201/103; B60N 2/56; B60N 2/976; B60N 2/914; B60N 2/002; B60N 2/5678; B60N 2/5685; B60N 2/60; B60N 2/665; B60N 2/58; A61B 5/02055; A61B 5/0205; A61B 5/4836; A61B 5/6893; A61B 5/021; A61B 5/024; A61B 5/742
USPC ...................... 601/48–49, 148–152
See application file for complete search history.

(56) References Cited

U.S. PATENT DOCUMENTS

| | | | | |
|---|---|---|---|---|
| 6,014,784 A * | 1/2000 | Taylor | ................ | A61G 7/05776 297/284.6 |
| 6,212,719 B1 * | 4/2001 | Thomas | ................ | A47C 27/082 601/149 |
| 8,348,870 B2 * | 1/2013 | Nagamitsu | ............. | A61H 7/007 601/149 |
| 2005/0228321 A1 * | 10/2005 | Liao | ..................... | A61H 9/0078 601/149 |
| 2008/0092295 A1 * | 4/2008 | Flick | .................. | A61G 7/05776 5/600 |
| 2010/0100017 A1 * | 4/2010 | Maguina | ............. | A61H 9/0078 601/151 |
| 2010/0289302 A1 * | 11/2010 | Cheng | .................. | B60N 2/0244 700/282 |
| 2011/0068611 A1 * | 3/2011 | Maeda | ..................... | B60N 2/66 297/284.4 |
| 2015/0141887 A1 * | 5/2015 | Kawashima | ............ | F16K 11/22 601/149 |
| 2016/0304009 A1 | 10/2016 | Ogiso et al. | | |
| 2018/0370405 A1 | 12/2018 | Klein | | |
| 2019/0217763 A1 * | 7/2019 | Mergl | ................ | A61H 23/0263 |
| 2021/0086677 A1 * | 3/2021 | Takahashi | ........... | B29C 44/1266 |

FOREIGN PATENT DOCUMENTS

| | | |
|---|---|---|
| DE | 112014005575 T5 | 8/2016 |
| EP | 3124320 A1 | 2/2017 |
| JP | 2005168953 A | 6/2005 |

OTHER PUBLICATIONS

Machine assisted English translation of DE10063478A1 obtained from https//patents.google.com/patent on May 20, 2020, 7 pages.
Machine assisted English translation of DE102011079712A1 obtained from https://patents.google.com/patent on May 20, 2020, 8 pages.

* cited by examiner

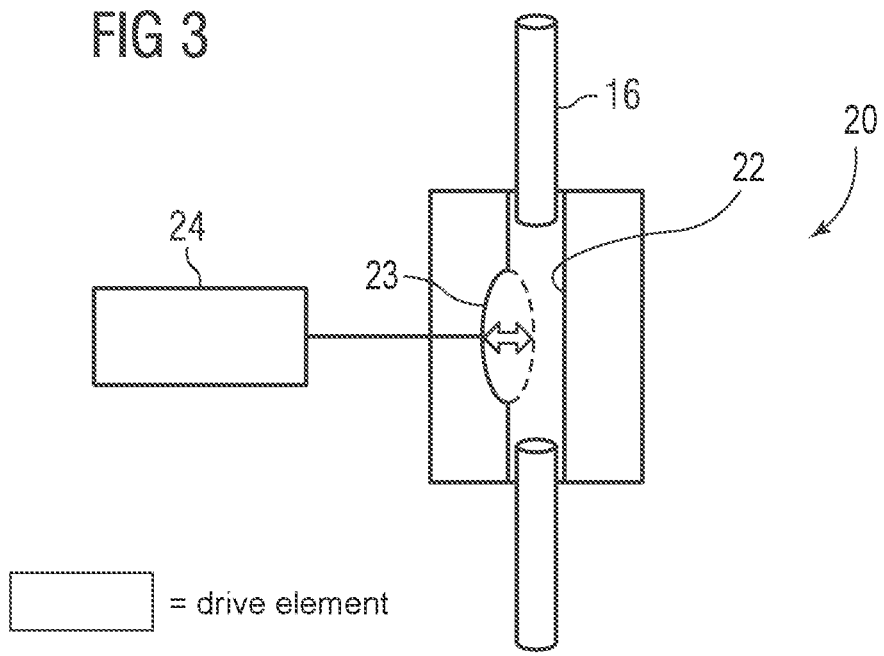
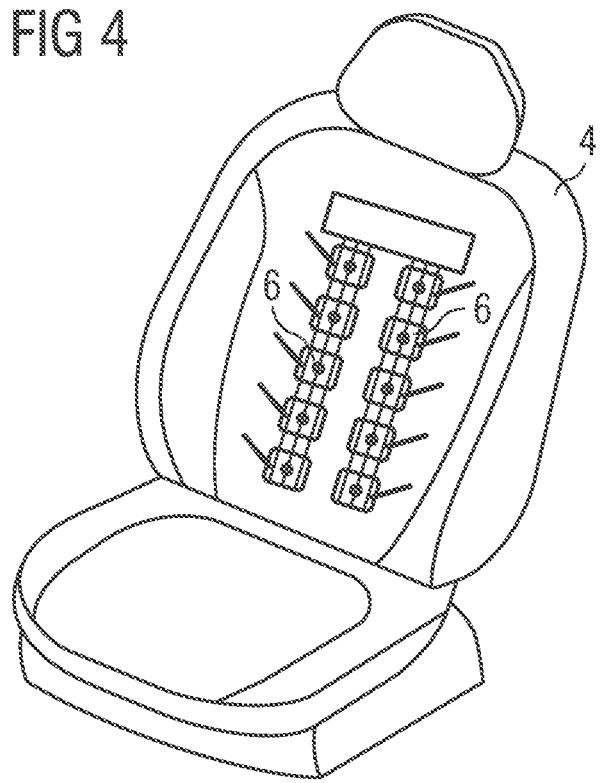

MASSAGE DEVICE AND SEAT WITH SUCH A MASSAGE DEVICE

CROSS-REFERENCE TO RELATED APPLICATIONS

This application claims priority to and all advantages of German Patent Application No. DE2019113629.3, filed on 22 May 2019, the content of which is hereby incorporated by reference.

FIELD OF THE INVENTION

The present invention relates to a massage device, in particular for a seat, and to a seat with such a massage device.

BACKGROUND OF THE INVENTION

According to the prior art, electro-pneumatic massage systems, e.g. for vehicle seats, are known. Such a device comprises at least one air cushion, an air supply system, which in particular comprises a pneumatic pump, as well as a valve and a valve control unit to control the supply of air to and the discharge of air from the air cushion. Such a massage system is known e.g. from DE 100 63 478 A1. Such a massage system may be combined with a lumbar support system.

In the known systems, the muscles of the user (occupant) of the seat are stimulated by stretching, pulling and pressing in order to increase the physical comfort of the user and counteract the development of tensions during long periods of seat use.

BRIEF SUMMARY

It is the object of the present invention to provide an alternative solution for generating a massage. In particular, the present invention provides a message device which is intended to be suitable for generating a vibration massage in the sense of an andullation therapy.

The massage device according to the present invention usable for a seat, in particular a vehicle seat, comprises at least one air cushion, wherein the at least one air cushion has an air inlet so as to allow individual filling thereof with air via an air supply system, wherein a vibration generating device is arranged between the air supply system and the air cushion and is in fluid communication with the air cushion so as to apply pressure vibrations to the air cushion. The advantage of the massage device according to the present invention is that the air cushion or cushions can be filled once with a desired filling volume and the pressure vibrations can then be generated exclusively via the vibration generating device. A further advantage is that both frequency and amplitude of the pressure vibration can be adjusted within a larger range of adjustment by a separate vibration generating device.

According to an embodiment, the vibration generating device comprises an air chamber with a variable volume and a drive element for varying the volume in the air chamber, the air chamber being in fluid communication with the air cushion. The air chamber may, according to an embodiment, comprise a membrane, which is moved by the drive element. The air chamber may be arranged in a (fluid) line.

The drive element is, expediently, one of a magnetic vibratory drive, a mechanical crank drive or an electroactive polymer.

The vibration generating device according to an embodiment generates a low-frequency oscillation. Such a low-frequency vibration is for example in the range of 0.5 Hz to 1000 Hz, alternatively between 3 Hz and 100 Hz, alternatively below 70 Hz.

The air supply system expediently comprises a valve control unit and a valve for each air cushion, the valve or valves being controlled by the valve control unit. The air volume of individual air cushions can thus be controlled individually. The present massage device may therefore also be additionally configured as a lumbar support device, or may be configured for individual contour adaptation of the seat.

According to an embodiment, the single vibration generating device is arranged in a line between the valve control unit and the air cushion in a flow-through geometry. According to an alternative embodiment, the vibration generating device is connected to the line between the valve control unit and the air cushion via a T-connector. The air chamber may be arranged in a supply line to a line between the air supply system and the air cushion or in a line between the air supply system and the air cushion. The lines between the air supply system and the air cushions are pneumatically separated from one another in an expedient manner.

The valve control unit is expediently connected to a plurality of air cushions, the vibration generating device being connected to some or to each individual one of the plurality of air cushions. The plurality of air cushions or all of the air cushions may have applied thereto the vibrations in phase or with a phase shift.

The seat, in particular the vehicle seat, according to the present invention comprises a massage device according to the present invention.

The massage device is expediently integrated in a backrest and/or a seating surface of the seat.

According to an embodiment, the air cushions are arranged in at least one, in particular at least two, in particular at least four rows.

BRIEF DESCRIPTION OF THE DRAWINGS

In the following, the present invention will be explained in more detail also with respect to further features and advantages on the basis of the description of embodiments and with reference to the enclosed drawings. The following figures show, each in a schematic diagram:

FIG. 3 shows a vibration generating device;
and
FIG. 4 shows a seat.

DETAILED DESCRIPTION

Figure 1:
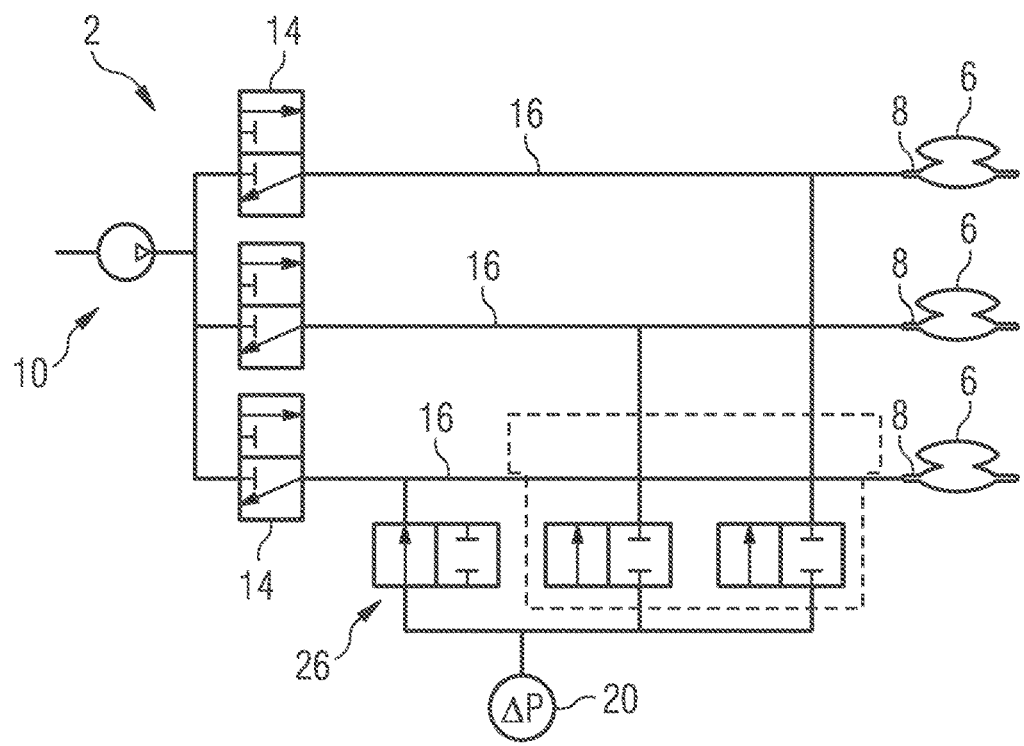
FIG. 1 shows a diagram of a massage device.

FIG. 1 shows a schematic circuit diagram of a first massage device 2. In the embodiment shown, the massage device 2 comprises three air cushions 6, each with an air inlet 8. The air cushions 6 are connected to a joint air supply system 10 comprising in particular a pump. Each line 16 between the air supply system 10 and the air cushions 6 has a valve 14 arranged therein, in particular a controllable valve. Parallel to each line 16, a vibration generating device 20 is arranged, which is connected to each of the lines 16 with a T-piece. At or in front of the T-piece a respective additional valve 26 may be arranged, in order to direct the vibrations precisely onto the individual air cushions or protect the vibration generating device against an excessively strong flow of air during air-bubble filling or emptying.

The air cushions 6 may, as shown, be composed of two interconnected chambers. A deviating structural design of the air cushions, e.g. with only one or more than two chambers, is possible.

Figure 2A:
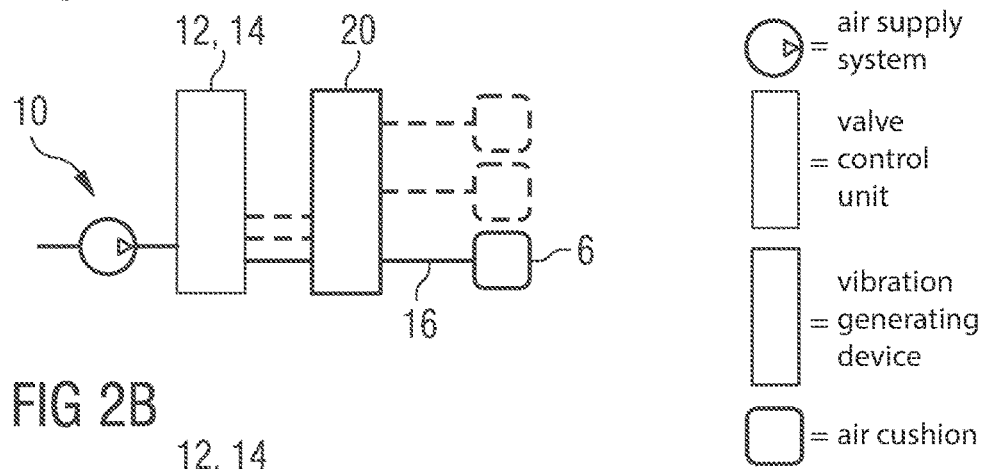
FIGS. 2a, b show a massage device.

FIG. 2a, b show two embodiments of the massage device 2. In FIG. 2a the number of air cushions 6 connected to an air supply system 10 is again three. On the air-supply-system side, a valve control unit 12 with three valves 14 is switched therebetween. On the air-cushion side, a vibration generating device 20 is switched into the lines 16. The individual lines 16 are pneumatically separated from the respective other lines.

Figure 2B:
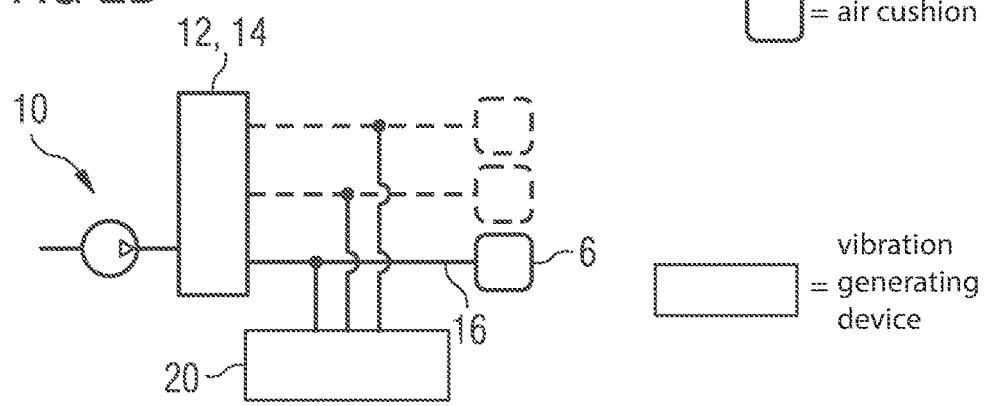

FIG. 2b shows an alternative embodiment. The vibration generating device is here switched into the lines 16 via a respective T-connector.

FIG. 3 shows an embodiment of a vibration generating device 20, which can be switched into a line 16. The vibration generating device 20 comprises an air chamber 22, which is adapted to be increased or reduced in volume via a drive element 24. For this purpose, a boundary of the air chamber 22 may consist e.g. of a membrane 23.

FIG. 4 shows an embodiment of a seat 4, in particular a vehicle seat. The seat 4 comprises air cushions 6 arranged in two rows in the backrest of the seat. The air cushions 6 are part of a massage device 2 according to the present invention. Each of the two rows of air cushions 6 is adapted to have vibrations applied thereto, independently of the other row, in an expedient manner via the vibration generating device 20.

LIST OF REFERENCE NUMERALS 2 massage device
4 seat
6 air cushions
8 air inlet
10 air supply system
12 valve control unit
14 valve
16 line
20 vibration generating device
22 air chamber
24 drive element
26 additional valve The terms "comprising" or "comprise" are used herein in their broadest sense to mean and encompass the notions of "including," "include," "consist(ing) essentially of," and "consist(ing) of. The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples. The term "about" as used herein serves to reasonably encompass or describe minor variations in numerical values measured by instrumental analysis or as a result of sample handling. Such minor variations may be in the order of ±0-25, ±0-10, ±0-5, or ±0-2.5, % of the numerical values. Further, The term "about" applies to both numerical values when associated with a range of values. Moreover, the term "about" may apply to numerical values even when not explicitly stated.

Generally, as used herein a hyphen "-" or dash "-" in a range of values is "to" or "through"; a ">" is "above" or "greater-than"; a "≥" is "at least" or "greater-than or equal to"; a "<" is "below" or "less-than"; and a "≤" is "at most" or "less-than or equal to." On an individual basis, each of the aforementioned applications for patent, patents, and/or patent application publications, is expressly incorporated herein by reference in its entirety in one or more non-limiting embodiments.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

The present invention has been described herein in an illustrative manner, and it is to be understood that the terminology which has been used is intended to be in the nature of words of description rather than of limitation. Many modifications and variations of the present invention are possible in light of the above teachings. The present invention may be practiced otherwise than as specifically described within the scope of the appended claims. The subject matter of all combinations of independent and dependent claims, both single and multiple dependent, is herein expressly contemplated.

What is claimed is:

1. A massage device for a seat, said massage device comprising at least one air cushion, wherein the at least one air cushion has an air inlet so as to allow individual filling thereof with air via an air supply system including a valve control unit; and
a single vibration generating device arranged between the air supply system and the at least one air cushion and in fluid communication with the at least one air cushion so as to apply pressure vibrations to the at least one air cushion, the vibration generating device including an air chamber having a variable volume and in fluid communication with the least one air cushion, the vibration generating device further including a drive element for varying the volume in the air chamber, the vibration generating device including the air chamber and associated drive element being arranged in a line between the valve control unit of the air supply system and the at least one air cushion in one of a flow-through geometry in the line or connected to the line between the valve control unit and the at least one air cushion via a T-connector.

2. The massage device according to claim 1, wherein the drive element is one of a magnetic vibratory drive, a mechanical crank drive or an electroactive polymer.

3. The massage device according to claim 1, wherein the vibration generating device generates a low-frequency vibration.

4. The massage device according to claim 1, wherein the air supply system comprises a valve for the at least one air cushion, the valve being controlled by the valve control unit.

5. The massage device according to claim 1, wherein the valve control unit is connected to the at least one air cushion, wherein the at least one air cushion includes a plurality of air cushions, and the vibration generating device being connected to some or to each individual one of the plurality of air cushions.

6. The massage device according to claim 1, wherein the seat includes a backrest.

7. The massage device according to claim 6, wherein the massage device is integrated in one of the backrest or a seating surface of the seat.

8. The massage device according to claim 6, wherein the at least one air cushion includes a plurality of air cushions, and the plurality of air cushions are arranged in at least one row.

9. The massage device according to claim 6, wherein the seat is a vehicle seat.

10. The massage device according to claim 6, wherein the at least one air cushion includes a plurality of air cushions, and the plurality of air cushions are arranged in at least two rows.

11. The massage device according to claim 6, wherein the at least one air cushion includes a plurality of air cushions, and the plurality of air cushions are arranged in at least four rows.

* * * * *